May 22, 1923.
J. F. WEBSTER
FLYTRAP
Filed June 26, 1922
1,456,413
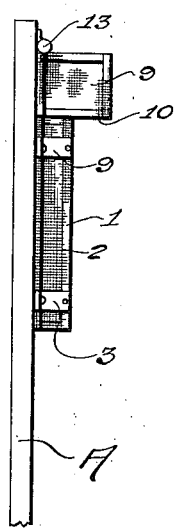
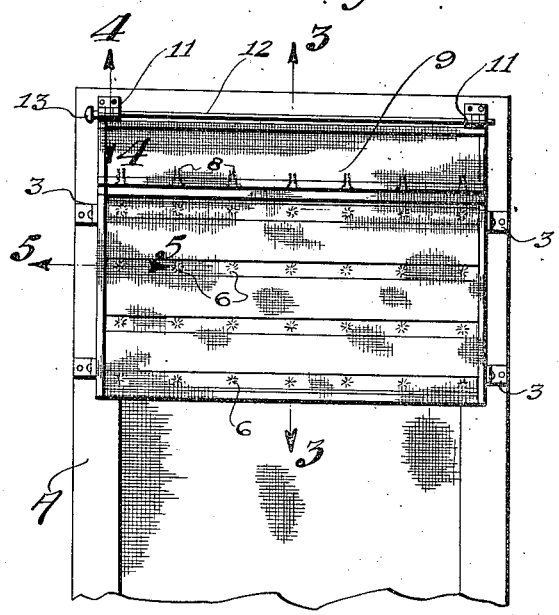
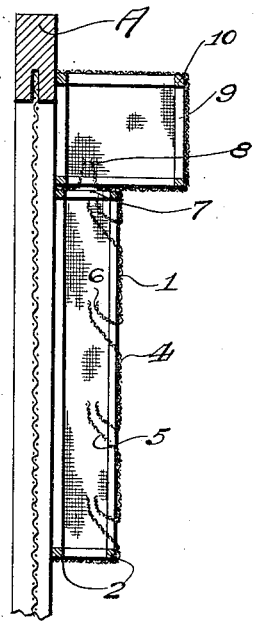
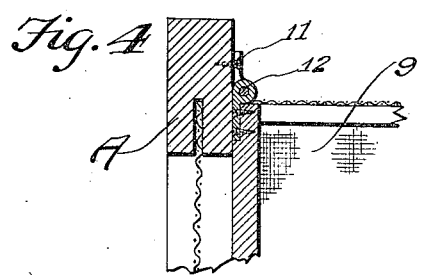
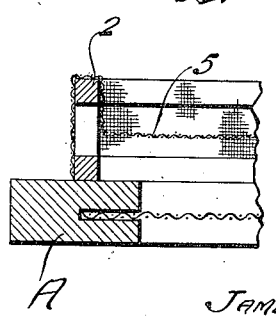
JAMES F. WEBSTER
INVENTOR
BY Victor J. Evans
ATTORNEY Patented May 22, 1923.

1,456,413

UNITED STATES PATENT OFFICE.

JAMES F. WEBSTER, OF COLFAX, INDIANA.

FLYTRAP.

Application filed June 26, 1922. Serial No. 570,832.

*To all whom it may concern:*

Be it known that I, JAMES F. WEBSTER, a citizen of the United States, residing at Colfax, in the county of Clinton and State of Indiana, have invented new and useful Improvements in Flytraps, of which the following is a specification.

This invention relates to fly traps, and an object of the invention is to provide a fly trap structure which may be attached to the outside of a screen door for catching flies. It is well known, that the natural tendency of house flies is to walk upwardly over a screen door, and therefore, the improved trap is designed to be attached to the upper portion of a screen door so that flies walking upwardly there over will enter the trap.

A further object of the invention is to provide a fly trap as specified which comprises an entrance compartment or body from which the flies may pass into a confining compartment which is hingedly and detachably carried by the screen door in receiving proximity with the entrance compartment.

Other objects of the invention will appear in the following detailed description taken in connection with the accompanying drawings wherein:

Fig. 1 is a front elevation of the improved fly trap showing it applied.

Fig. 2 is a side elevation of the fly trap showing it applied.

Fig. 3 is a vertical section taken on the line 3—3 of Fig. 1.

Fig. 4 is a fragmentary section on the line 4—4 of Fig. 1.

Fig. 5 is a fragmentary sectional view taken on the line 5—5 of Fig. 1.

Referring more particularly to the drawings, the improved fly trap comprises a receiving compartment 1, which is formed of screen wire or suitable analogous material and is braced by a suitable bracing frame 2. The receiving or entrance compartment 1 is adapted to be detachably attached to a screen door A by suitable angled attaching clips 3 and its front side 4 has a plurality of inwardly extending upwardly inclining leads 5 struck inwardly therefrom and extending entirely across the front side, as clearly shown in Figs. 1 and 5 of the drawings.

These inwardly inclining leads 5 have their sides converging as they extend inwardly, and they are provided, at spaced points with openings 6, at their innermost portions or apexes, through which the flies are adapted to enter the entrance or receiving compartment or member 1. The top or upper edge of the entrance compartment 1 is provided with a longitudinally extending opening 7 through which the flies are permitted to pass, for passing through the leads 8 into the confining compartment 9. The confining compartment 9 rests upon and extends completely across the top of the entrance compartment and like the entrance compartment is formed of screen wire suitably braced by bracing frames 10. The confining compartment 9 is hingedly connected, by means of hinges 11 and the hinge pintle 12 to the screen door A, and as clearly shown in Fig. 1 of the drawings the hinge pintle 12 extends beyond the hinges 11 and has a head 13 formed thereon to facilitate its withdrawal from the hinges to permit detachment of the confining compartment 9 from the screen door, for the purpose of destroying the flies or other insects congregated therein.

It is, of course, to be understood that the invention may be constructed in other manners and the parts associated in different relations and, therefore, I do not desire to be limited in any manner except as set forth in the claim hereunto appended.

Having thus described my invention what I claim is:

In a fly trap, the combination with a screen door, of a foraminous body carried thereby and forming an entrance compartment, one side of said foraminous body provided with a plurality of transverse inwardly extending leads, a confining compartment hingedly connected to the screen door by means of hinges, and a removable hinge pintle to permit detachment of the confining compartment from the screen door, and a plurality of leads leading into the confining compartment from said entrance compartment.

In testimony whereof I affix my signature.

JAMES F. WEBSTER.